Patented Sept. 14, 1943

2,329,663

UNITED STATES PATENT OFFICE 2,329,663

COATING COMPOSITION CONTAINING MANILA RESIN

Robert C. Swain, Riverside, and Pierrepont Adams, Stamford, Conn., assignors to American Cyanamid Company, New York, N. Y., a corporation of Maine No Drawing. Application November 26, 1940, Serial No. 367,220

4 Claims. (Cl. 260—24)

This invention relates to coating compositions containing Manila resin and melamine-formaldehyde resins.

An object of this invention is to improve the physical and chemical properties of coating compositions containing Manila resin, e. g., adhesion, alkali resistance, water resistance, solvent resistance, etc., as well as to decrease the thermoplasticity of such compositions.

Another object of this invention is to provide compositions containing Manila resin and compatible proportions of compatible melamine-formaldehyde resins.

These and other objects are attained by blending Manila resin with a melamine-formaldehyde resin which has been alkylated with an alcohol containing at least 4 carbon atoms and wherein the molal ratio of formaldehyde to melamine is at least about 2.5:1.

The following examples in which the proportions are in parts by weight are given by way of illustration and not in limitation.

Example 1

| | Parts |
|---|---|
| Melamine-formaldehyde resin "A" | 10 |
| Manila resin | 90 |

A composition containing these ingredients is prepared by admixing 20 parts of melamine-formaldehyde resin "A" solution (50% resin) with 360 parts of "Manila resin stock solution" (containing 25% of Manila resin and 75% of the monoethyl ether of ethylene glycol ("Cellosolve")). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 25 |
| Manila resin | 75 |

A composition containing these ingredients is prepared by admixing 50 parts of melamine-formaldehyde resin "B" solution (50% resin) with 300 parts of "Manila resin stock solution." Films of the composition are applied to metal objects and baked at a temperature of about 135° C. for about one-half hour. The product is a clear, water-white film which is extremely mar-resistant.

Example 3

| | Parts |
|---|---|
| Melamine-formaldehyde resin "C" | 50 |
| Manila resin | 50 |

A composition containing these ingredients is prepared by admixing 100 parts of melamine-formaldehyde resin "C" solution (50% resin) with 200 parts of "Manila resin stock solution." Films of the composition are applied to metal objects and baked at a temperature of about 135° C. for about one-half hour. A film having excellent properties, such as water resistance, is formed.

Example 4

| | Parts |
|---|---|
| Melamine-formaldehyde resin "B" | 75 |
| Manila resin | 25 |

A composition containing these ingredients is prepared by admixing 150 parts of melamine-formaldehyde resin "B" solution (50% resin) with 100 parts of "Manila resin stock solution." Films of the composition are applied to metal objects and baked at a temperature of about 135° C. for about one-half hour. A clear, tough film is formed.

Example 5

| | Parts |
|---|---|
| Melamine-formaldehyde resin "A" | 90 |
| Manila resin | 10 |

A composition containing these ingredients is prepared by admixing 180 parts of melamine-formaldehyde resin "A" solution (50% resin) with 40 parts of "Manila resin stock solution." Films of the composition are applied to metal objects and baked at a temperature of about 135° C. for about one-half hour. A water-white film having good chemical properties is formed.

Example 6

| | Parts |
|---|---|
| Melamine-formaldehyde resin "D" | 10 |
| Manila resin | 90 |

A composition containing these ingredients is prepared by admixing 20 parts of melamine-formaldehyde resin "D" solution (50% resin) with 360 parts of "Manila resin stock solution." Films of the composition are applied to metal objects and baked at a temperature of about 135° C. for about one-half hour. The product formed is a very hard, clear coating.

Example 7

| | Parts |
|---|---|
| Melamine-formaldehyde resin "E" | 25 |
| Manila resin | 75 |

A composition containing these ingredients is prepared by admixing 50 parts of melamine-formaldehyde resin "E" solution (50% resin)

with 300 parts of "Manila resin stock solution." Films of the composition are applied to metal objects and baked at a temperature of about 135° C. for about one-half hour. The product is a transparent, resistant coating.

Example 8

| | Parts |
|---|---|
| Melamine-formaldehyde resin "F" | 75 |
| Manila resin | 25 |

A composition containing these ingredients is prepared by admixing 150 parts of melamine-formaldehyde resin "F" solution (50% resin) with 100 parts of "Manila resin stock solution." Films of the composition are applied to metal objects and baked at a temperature of about 135° C. for about one-half hour. A film having good chemical properties is formed.

Example 9

| | Parts |
|---|---|
| Melamine-formaldehyde resin "G" | 75 |
| Manila resin | 25 |

A composition containing these ingredients is prepared by admixing 150 parts of melamine-formaldehyde resin "G" solution (50% resin) with 100 parts of "Manila resin stock solution." Films of the composition are applied to metal objects and baked at a temperature of about 135° C. for about one-half hour.

Example 10

| | Parts |
|---|---|
| Melamine-formaldehyde resin "D" | 90 |
| Manila resin | 10 |

A composition containing these ingredients is prepared by admixing 180 parts of melamine-formaldehyde resin "D" solution (50% resin) with 40 parts of "Manila resin stock solution." Films of the composition are applied to metal objects and baked at a temperature of about 135° C. for about one-half hour, to give a smooth transparent surface.

*Preparation of melamine-formaldehyde resin "A"*

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "B"*

| | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine (1 mol) | 126 |
| Formalin (6 mols) (37% formaldehyde in water) | 486.6 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "D"*

| | Parts |
|---|---|
| Melamine | 283 |
| Formalin (37% formaldehyde in water) | 978 |

This mixture is heated at about 70–80° C. until a homogeneous solution is obtained. The pH is adjusted to about 7.3 with caustic soda and vacuum concentrated to remove about 50–60% of the free water. Sufficient phosphoric acid is added to neutralize the caustic soda present and then 320 parts of methanol are added. Wet methanol is gradually distilled off from the mixture and dry methanol is added at about the same rate as wet methanol is distilled off. This distillation and addition of methanol is continued until the distillate is substantially dry methanol. During this operation which requires about 4 hours, about 1600 parts of methanol are added. 707 parts of "Pentasol" (trade name of Sharples Solvents Corporation for mixed amyl alcohols) are added and the distillation is continued until the vapor temperature rises to about 100–105° C. About 710 parts of the distillate are collected. The pressure is lowered sufficiently to reduce the temperature to 80–90° C. and 178 parts more of the distillate are collected, leaving as a product a resin solution containing 50% of resin solids in "Pentasol."

*Preparation of melamine-formaldehyde resin "E"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "F"*

| | Parts |
|---|---|
| Melamine-formaldehyde (molal ratio 1:4) spray-dried powder | 200 |
| 2-ethyl hexanol | 280 |
| n-Butanol | 320 |
| Methyl acid phosphate | 4 |

The melamine-formaldehyde condensation product is obtained by refluxing melamine and formalin (37% formaldehyde in water) in the molal ratio of 1:4 at a pH of about 7–9 for about 3 hours and then spray-drying.

The spray-dried melamine-formaldehyde powder, octanol, butanol and methyl acid phosphate are heated to about 100–105° C. in 30 minutes and refluxed about 30 minutes. This solution is vacuum concentrated at about 50–70° C. to form a product containing about 50% solids.

*Preparation of melamine-formaldehyde resin "G"*

| | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93–95° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, the hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., ethyl ether, ethanol, isopropanol, the monoethyl ether of ethylene glycol ("Cellosolve"), amyl acetate, acetone, etc., may be added to the original solutions of Manila resin and melamine-formaldehyde resin in order to produce perfectly clear solutions if such solutions are not originally obtained.

While formaldehyde has been used in the previous examples, it will be obvious that the various polymers of formaldehyde, e. g., paraformaldehyde, or substances which yield formaldehyde may be used in place of part or all of the formaldehyde.

As indicated by the above examples Manila resin has been found to be compatible with melamine-formaldehyde resins wherein the molal ratio of formaldehyde to melamine is at least about 2.5:1. Butylated melamine-formaldehyde resins wherein the molal ratio of formaldehyde to melamine is about 2.5:1 may be substituted for part or all of the melamine resins used in the above examples. Such resins may be produced by reacting the melamine resins with methanol and subsequently replacing the methanol with butanol. Melamine-formaldehyde resins which are alkylated with ethyl alcohol and wherein the molal ratio of formaldehyde to melamine is about 5:1 are compatible in proportions greater than about 80% (totals solids weight basis) as are also melamine-formaldehyde resins alkylated with propyl alcohol wherein the molal ratio of formaldehyde to melamine is about 4:1. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine.

The resins may be alkylated with any of the straight chain or branched chain alcohols containing at least 4 carbon atoms, as well as with aralkyl types of alcohols such as benzyl alcohol. The term "alkylated melamine-formaldehyde resin" is intended to denote compositions which are reacted with an alcohol.

Our products may be plasticized with a wide variety of materials such as the alkyl phthalates, tricresyl phosphate, various alkyd resins, particularly the fatty oil acid modified alkyd resins, etc.

Various fillers, pigments, dyes and lakes may be added to our compositions, e. g., lithopone, zinc oxide, titanium oxide, ferric oxide, Prussian blue, toluidine red, malachite green, mica, asbestos, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances, are, for instance, phosphoric acid, ammonium salts of phosphoric acid, etc.

Other resinous compositions may be included in various coating compositions, e. g., urea-formaldehyde resins, phenol-formaldehyde resins, alkyd resins, ethyl cellulose, cellulose acetate, nitrocellulose, etc., as well as in varnishes, especially drying oil varnishes such as linseed oil varnishes, tung oil varnishes, etc.

Our mixed products show improved adhesion, alkali resistance, water resistance, solvent resistance, etc., as compared to Manila resin compositions not containing melamine-formaldehyde resins. Substantial proportions of melamine-formaldehyde resins also markedly decrease the thermoplastic character of the Manila resin.

Our compositions are useful in the manufacture of paints, lacquers, varnishes and the like. They may be used in printing inks, as well as in the production of insulating materials by impregnating cloth, paper, etc., therewith. Our products may also be used in the manufacture of oil cloth, linoleum, etc.

The term "compatible" as used herein is intended to denote compositions, films of which are clear and homogeneous after baking.

Obviously many modifications and variations in the compositions and processes described above may be made without departing from the spirit and scope of the invention as defined in the appended claims.

We claim:

1. A coating composition containing substantial amounts of Manila resin and a melamine-formaldehyde resin which has been alkylated with an alcohol containing at least 4 carbon atoms, wherein the molal ratio of formaldehyde to melamine is at least about 2.5:1 and when the weight ratio of Manila resin to melamine resin is between about 9:1 and 1:9.

2. A coating composition containing substantial amounts of Manila resin and a melamine-formaldehyde resin which has been alkylated with n-butanol wherein the molal ratio of formaldehyde to melamine is at least about 2.5:1 and wherein the weight ratio of Manila resin to melamine resin is between about 9:1 and 1:9.

3. A coating composition containing substantial amounts of Manila resin and a melamine-formaldehyde resin which has been alkylated with n-hexyl alcohol wherein the molal ratio of formaldehyde to melamine is at least about 2.5:1 and wherein the weight ratio of Manila resin to melamine resin is between about 9:1 and 1:9.

4. A coating composition containing substantial amounts of Manila resin and a melamine-formaldehyde resin which has been alkylated with benzyl alcohol wherein the molal ratio of formaldehyde to melamine is at least about 2.5:1 and wherein the weight ratio of Manila resin to melamine resin is between about 9:1 and 1:9.

ROBERT C. SWAIN.
PIERREPONT ADAMS.